United States Patent
Gorbunov et al.

(10) Patent No.: US 8,069,001 B1
(45) Date of Patent: Nov. 29, 2011

(54) THERMAL PROTECTION SYSTEM ABLATION SENSOR

(75) Inventors: Sergey Gorbunov, Santa Clara, CA (US); Edward R. Martinez, San Jose, CA (US); James B. Scott, Santa Clara, CA (US); Tomomi Oishi, Mountain View, CA (US); Johnny Fu, San Leandro, CA (US); Joseph G. Mach, Santa Clara, CA (US); Jose B. Santos, Milpitas, CA (US)

(73) Assignee: The United States of America as represented by the Administrator of the National Aeronautics & Space Administration (NASA), Washington, DC (US)

(*) Notice: Subject to any disclaimer, the term of this patent is extended or adjusted under 35 U.S.C. 154(b) by 280 days.

(21) Appl. No.: 12/319,918

(22) Filed: Jan. 2, 2009

(51) Int. Cl.
*A61B 18/18* (2006.01)

(52) U.S. Cl. ............... 702/64; 702/33; 702/34; 702/35; 702/65; 702/130; 702/132; 702/133; 702/136; 606/21; 606/32; 606/34; 606/41; 600/549

(58) Field of Classification Search .............. 702/33, 702/34, 35, 64, 65, 130, 132, 133, 136; 606/21, 606/32, 34, 41; 600/549
See application file for complete search history.

(56) References Cited

U.S. PATENT DOCUMENTS

| | | | |
|---|---|---|---|
| 4,410,851 A * | 10/1983 | Goffaux | ............ 324/546 |
| 6,312,425 B1 | 11/2001 | Simpson et al. | |
| 6,740,080 B2 | 5/2004 | Jain et al. | |
| 6,752,804 B2 | 6/2004 | Simpson et al. | |
| 2003/0014044 A1 | 1/2003 | Krishnan et al. | |
| 2003/0100895 A1 | 5/2003 | Simpson et al. | |
| 2008/0161797 A1 | 7/2008 | Wang et al. | |
| 2009/0306638 A1 | 12/2009 | Hilley et al. | |

OTHER PUBLICATIONS

Oishi, et al., Development and Application of a TPS Ablation Sensor for Flight, 46th AIAA Aerospace Sciences Meeting and Exhibit, Jan. 7-10, 2008, Reno, Nevada.

Cassanto, A Simple Recession Gage for Inflight Measurement of the Char Degradation Zone for Re-Entry Vehicle Heat Shields, Proceeds of the 26th International Instrumentation Symposium, May 5-8, 1980, Seattle, Washington, Instrument Society of America.

* cited by examiner

*Primary Examiner* — Sujoy Kundu
(74) *Attorney, Agent, or Firm* — John F. Schipper; Robert M. Padilla

(57) ABSTRACT

An isotherm sensor tracks space vehicle temperatures by a thermal protection system (TPS) material during vehicle re-entry as a function of time, and surface recession through calibration, calculation, analysis and exposed surface modeling. Sensor design includes: two resistive conductors, wound around a tube, with a first end of each conductor connected to a constant current source, and second ends electrically insulated from each other by a selected material that becomes an electrically conductive char at higher temperatures to thereby complete an electrical circuit. The sensor conductors become shorter as ablation proceeds and reduced resistance in the completed electrical circuit (proportional to conductor length) is continually monitored, using measured end-to-end voltage change or current in the circuit. Thermocouple and/or piezoelectric measurements provide consistency checks on local temperatures.

13 Claims, 4 Drawing Sheets

THERMAL PROTECTION SYSTEM ABLATION SENSOR

ORIGIN OF THE INVENTION

This invention was made, in part, by one or more employees of the U.S. government and may be made, used and/or sold by the U.S. government without payment of royalties or other compensation thereon.

FIELD OF THE INVENTION

This invention relates to an ablation sensor for a thermal protection system for a space vehicle encountering very high temperatures during atmospheric re-entry.

BACKGROUND OF THE INVENTION

Many different designs of surface recession sensors have been fabricated and tested in entry vehicle applications for the Department of Defense, ranging from simple thermocouples and "breakwire" arrangements to more complicated devices such as radiation sensors. In a breakwire sensor arrangement, multiple thermocouples or pairs of wires are embedded in a thermal protection system (TPS) plug with their junctions located at different depths that will sense different local temperatures, as shown in FIG. 1.

Theoretically, as the TPS surface recedes and/or chars, the increasing heat progressively melts each wire and breaks the circuit. However, in practice it is found that the receding char layer becomes conductive and serves as an electrical contact between the melted wires which leads to erroneous conclusions that the circuit has not yet broken. In radiation transducer recession sensors, radioactive particles are embedded in a TPS material at selected depths. The strength of the radiation measured by a Geiger counter decreases as more radioactive particles are removed due to surface recession.

One of the more successful efforts in the development of a surface recession sensor is the quartz-based Analog Resistance Ablation Detector (ARAD), originally developed by General Electric. ARAD had been tested in three-dimensional quartz phenolic. The NASA probe heat shield was instrumented with ARADs to monitor the probe's heat shield shape and mass loss during its entry into Jupiter's atmosphere. The ARAD design implemented for used the same operating principal as the quartz-based ARAD but with different materials. Though there were some issues in the measured data, a NASA version of ARAD met scientific objectives because it provided the valuable information that the ablation was substantially axisymmetric, and the returned data allowed the final heat shield shape to be reconstructed.

Several improvements in accuracy and flexibility of the system are needed. One or more methods for checking consistency of the recession measurements is needed, and an increase in resolution of these measurement is needed to identify anomalies that may occur in the measurement process.

SUMMARY OF THE INVENTION

These needs are met by the invention, which provides a system for evaluating in-depth thermal response correlated to shape of a surface that is undergoing ablation, recession or another thermal transformation process. A time varying length $L(t)$ of a surface is estimated by measuring a voltage drop and corresponding time varying resistance $R(t)$ in one or two wires that are affected by the recession process. An electrically insulating barrier to passage of current in the wire(s) becomes conductive at high temperatures and acts to complete the electrical circuit between the wires. The recession surface is provided as a wire-wrapped hollow tube, rather than as a solid body, to improve resolution and to allow performance of consistency checks on the recession measurements.

An isotherm sensor tracks vehicle temperatures by a thermal protection system (TPS) material during vehicle re-entry into a planetary atmosphere as a function of time, and surface recession through calibration, calculation, analysis and exposed surface modeling. Sensor design includes: two identical resistive conductors, with a first end of each connected to a constant current source, and second ends electrically insulated from each other by a selected material that is electrically insulating at low temperatures and is an electrically conductive char at higher temperature to thereby complete an electrical circuit. The sensor conductors become shorter as ablation proceeds and reduced resistance in the completed electrical circuit (proportional to conductor length) is continually monitored, using measured end-to-end voltage change or current in the circuit.

DESCRIPTION OF BEST MODE OF THE INVENTION

Figure 1:
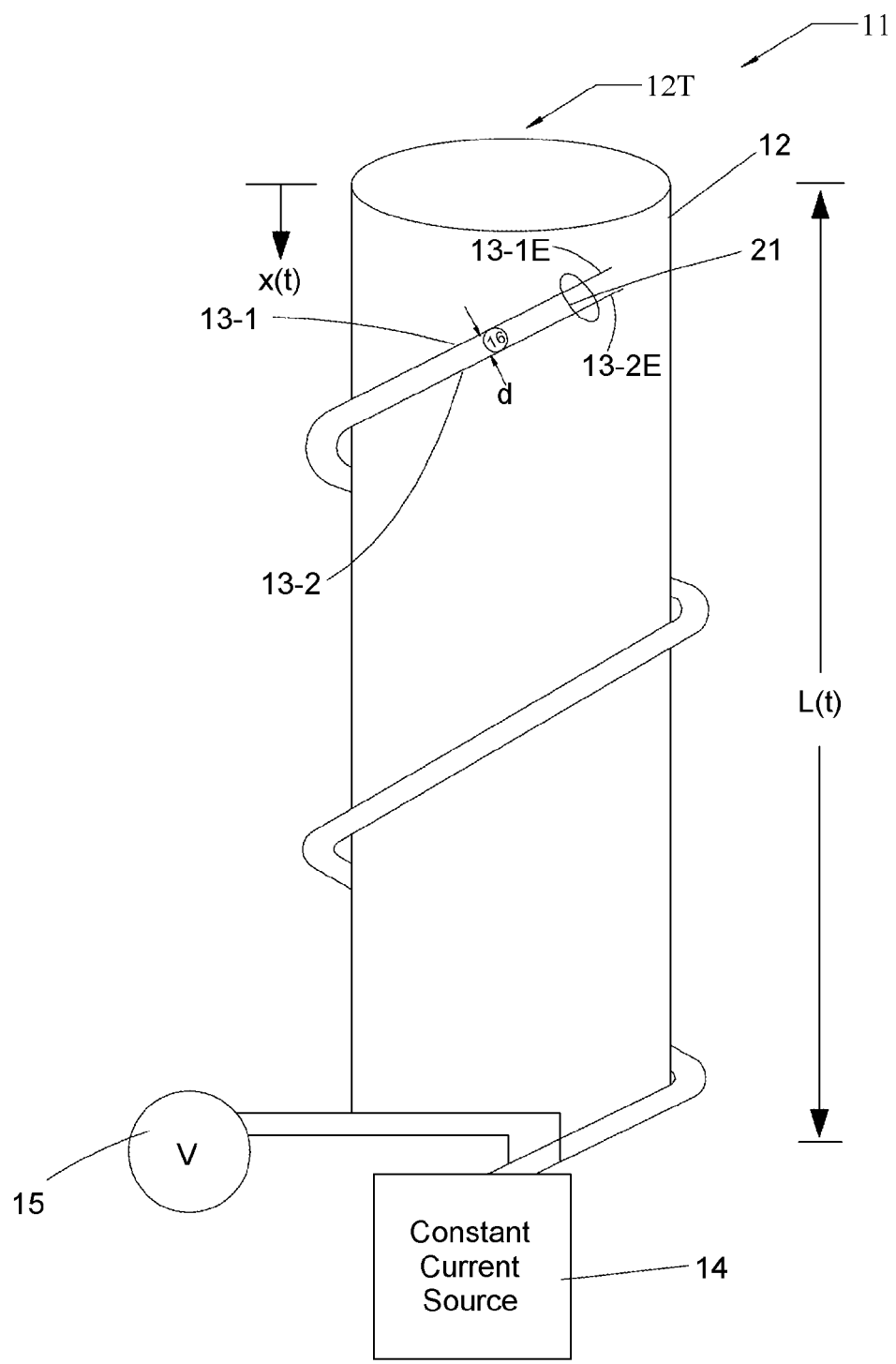
FIG. 1 schematically illustrates an embodiment of the invention.

FIG. 1 is a schematic illustration of an embodiment 11 of the invention. A thin hollow tube 12 of a selected material (e.g., polyimide or kapton) has first and second electrically conducting wires, 13-1 and 13-2, wrapped in a helical configuration around the tube. The first and second wires, 13-1 and 13-2, are wrapped parallel to each other around the tube 12 and are spaced apart a small distance d=0.001-0.003 inch. First ends of the first and second wires, 13-1 and 13-2, are connected to a constant current source 14 that delivers a substantially constant current I to at least one of the first and second wires. The first and second wire materials may be different (e.g., Pd—W, Pt—W, Pt, Pd, W or Ni) or may be the same. Preferably, the wire materials are chosen to have very low thermal coefficients of resistivity so that the parameters $\rho 1$ and $\rho 2$ do not vary appreciably with temperature T.

A voltmeter 15 is connected to the first and second wires, 13-1 and 13-2, to measure, an optionally display, a voltage difference between these two wires, measured adjacent to the connections (terminals) to the constant current source 14. Second ends, 13-1E and 13-2E, of the first and second wires are spaced apart a sufficient distance d0 so that initially no current flows between these first and second wires. The space between the first and second wires is filled with a selected electrically insulating material 16, such as polyimide. Initially, the voltmeter 15 will measure substantially zero voltage because no current is established between the first and second wires at the second ends thereof.

When the top 12T of the tube 12 recedes, due to ablation or some other pyrolyzing process, the x-coordinate x(t) corresponding to the top 12T changes with time t, and the insulating spacer material 16 becomes charred. The second ends, 13-1E and 13-2E, of the first and second wires become joined by an electrically conductive char region, 21, illustrated in FIG. 1. The char region 21 is an end result of pyrolysis of material adjacent to the second ends, 13-1E and 13-2E, of the first and second wires. The char region 21 is short and is found to be electrically conductive so that an electrically conducting path is now established between first and second terminals of the voltmeter 15, depending upon a sum of the component resistances between the first and second terminals. The voltmeter 15 will measure a voltage, V=V(t), between the terminals that varies with time t according to a sum of resistances, $$R(t)=R(\text{lead})+\rho1\cdot g\cdot L(t)+R1(\text{int})+R(\text{char})+R2(\text{int})+\rho2\cdot g\cdot L(t)+R(\text{lead}), \quad (1)$$

where R(lead) refers to a resistance associated with a voltmeter lead, $\rho1$ and $\rho2$ are resistivity parameters (Ohms per unit length) for the respective first and second wires, L(t) is a remaining length of the tube (not yet pyrolyzed), measured along an axis AA of the tube, g (>1) is a dimensionless geometric factor that converts the length L(t) (measured along the axis AA) to a corresponding arc length of the wires (measured along the tube perimeter), R1(int) and R2(int) are interface contact resistances associated with a change from virgin (unpyrolyzed) material in the respective first and second wires to the charred region 21, and R(char) is a resistance component associated with the char region itself. Where the number of turns of first wires (or turns of second wires) per unit length is $n_t$, and the wire length of one turn is $L_t$, the geometric factor g is approximated by $$g \approx n_t \cdot (L_t/L0), \quad (2)$$

where L0 is a unit length (e.g., one inch) of the first or second wire (uncharred).

Because the second ends, 13-1E and 13-2E, of the first and second wires, 13-1 and 13-2, are close to each other, the resistance component R(char) is estimated to be very small, typically less than 1 percent of the resistances $\rho1 \cdot g \cdot L(t)$ and $\rho2 \cdot g \cdot L(t)$ associated with the wires themselves. In the initial analysis, the values R1(int), R2(int) and R(char) are treated as negligible so that the resistance R(t) can be approximated as $$R(t) \approx 2R(\text{lead})+\rho1\cdot g\cdot L(t)+\rho2\cdot g\cdot L(t). \quad (3)$$

All quantities in Eq. (2) are known or determinable, except the time varying length L(t). Using the approximation for resistance R(t) in Eq. (3), the voltage V(t) measured at the voltmeter 15 becomes $$V(t)=I\cdot R(t), \quad (4)$$

and the unknown length L(t) is approximated as $$L(t)=\{V(t)/I-2R(\text{lead})\}/(\rho1\cdot g\cdot+\rho2\cdot g\cdot) \quad (5)$$

If the voltage V(t) is monotonic (e.g., decreasing) in time, the length L(t) will also be monotonic. The remaining length L(t) of the tube is estimated using Eq. (5) and the measured voltmeter reading V(t).

The material for the hollow tube may include a cylindrical sector of piezoelectric (PZT) material that develops a voltage difference ΔV between two spaced apart locations along a longitudinal axis of the tube 12 in response to imposition of a non-zero longitudinal strain on the piezoelectric material. This measured voltage difference value may be used to estimate a local strain (longitudinal) that the tube 12 experiences during the ablation, recession or other perturbation.

Because the tube is or resembles a hollow cylinder, one, two or more sectors, 26 (FIG. 2), of piezoelectric material can be used, rather then providing piezoelectric material on an entire surface (inside or outside) of the tube 12.

Because the hollow tube deforms more easily than does a solid cylinder, the voltage difference induced a separate PZT voltmeter 27 between two longitudinally spaced points, 28-1 and 28-2, along the tube axis (FIG. 2) is more accurate than a similar voltage difference that might be induced for two longitudinally spaced points along a solid cylinder axis.

Figure 2:
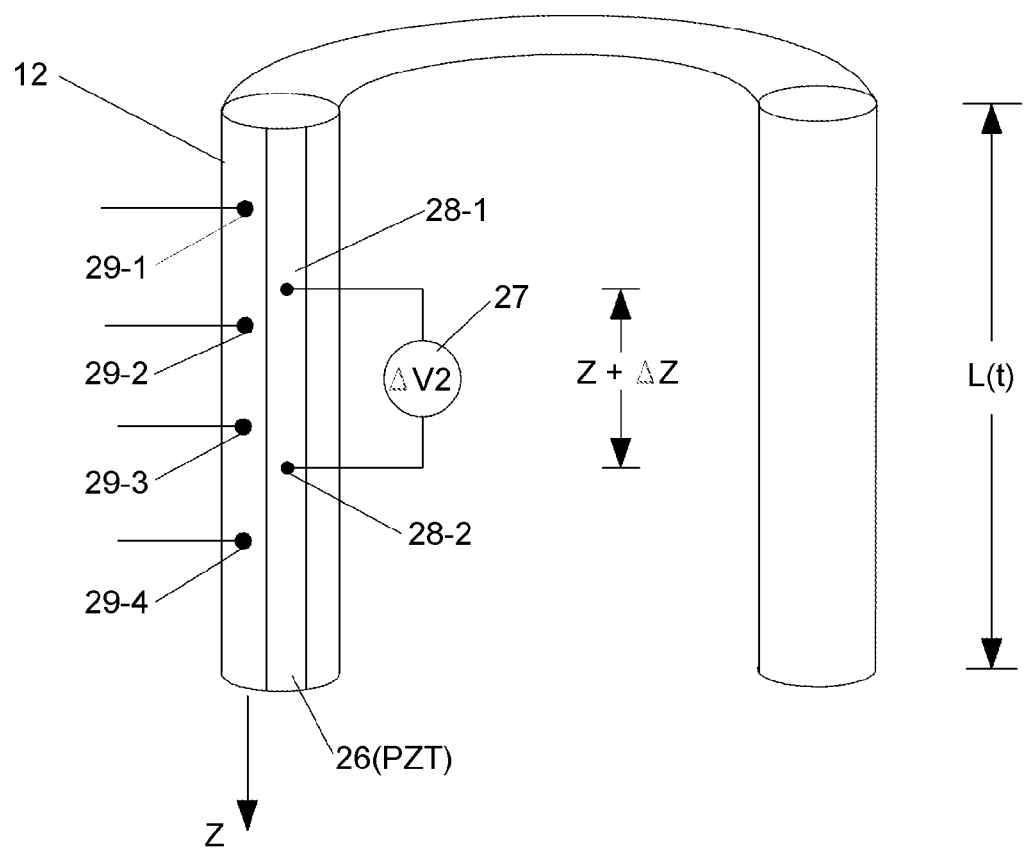
FIGS. 2 and 3 schematically illustrate embodiments with PZT sensors and thermocouple sensors positioned in or on the tube.

As also illustrated in FIG. 2, thermocouple sensors, 29-$k$ (k=1, . . . , K; K≧2) may also be positioned at K spaced apart locations along the tube axis, to measure and to provide thermal readout measured values on the tube, as a function of time as surface recession proceeds. Optionally, a piezoelectric sector 26, a voltmeter 27 and two or more thermocouple sensors 29-$k$ can be provided on each of the two tube components 12, as illustrated in FIG. 2, and separate measurements on each of the tube components can be compared for checking consistency of recession.

For example, where first and second PZT locator points are positioned adjacent to first and second thermocouple sensors, respectively, and the first and second local temperatures measured by the sensors are T1 and T2, the temperature T(z) along a line segment joining the first and second thermocouple sensor locations (z=z1 and z=z2) may be approximated as $$T(z)=\{T1\cdot(z-z2)+T2\cdot(z-z1)\}/(z2-z1). \quad (6)$$

If the thermal expansion coefficient of the PZT material is α, the average change Δz in longitudinal length of the tube between the first and second sensor locations (z=z1 and z=z2) is approximated as $$\Delta z_T = \alpha\{(T1+T2)/2-T0\}, \quad (7)$$

where T0 is a reference temperature for the tube material. The change Δz in longitudinal length, determined from the thermocouple readings, may be compared with a corresponding length indicated by a piezoelectric voltage reading for the pair of locations, z=z1 and z=z2, $$\Delta z_{PZT}(\text{long})=\beta\cdot \Delta V2(PZT), \quad (8)$$

where β is a PZT coefficient in appropriate units relating PZT voltage difference ΔV2 and longitudinal length change. Where $\Delta z_T$ and $\Delta z_{PZT}$(long) differ by more than a threshold amount (inconsistent local temperatures estimates), at least one of these two measurements is suspect and should be re-examined.

Figure 3:
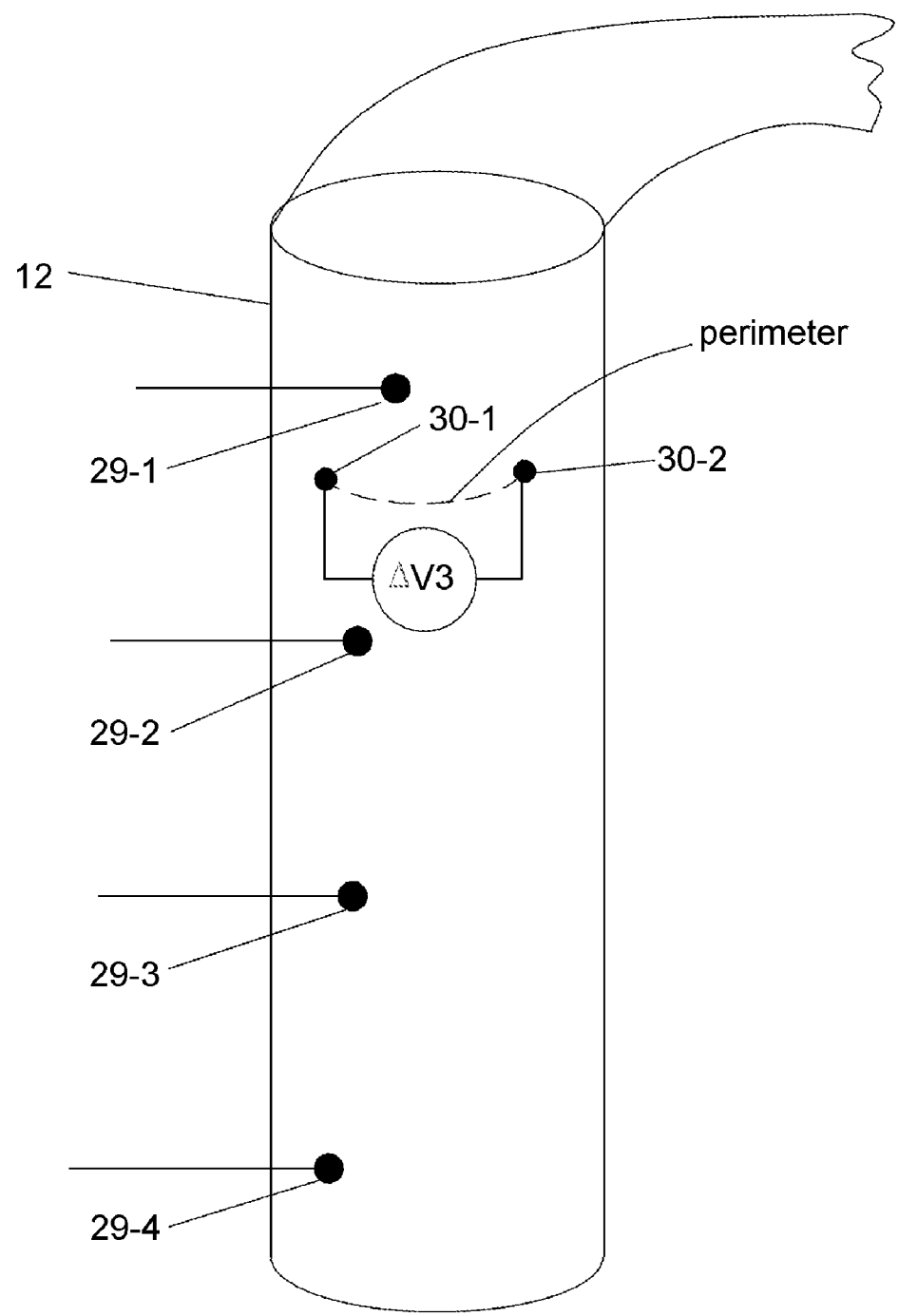

FIG. 2 illustrates use of a PZT material oriented substantially parallel to a longitudinal axis of the tube 12, where a longitudinal distance $\Delta z_{PZT}$(long) between the PZT locator points is estimated using Eq. (8). FIG. 3 illustrates use of a PZT material oriented substantially along a circumference or perimeter of the tube 12 (perpendicular to the longitudinal axis), with PZT locator points 30-1 and 30-2, where a change in total circumference or perimeter length is estimated as $$\Delta p_{PZT}(\text{peri})=\beta'\cdot \Delta V3(PZT)\cdot p0, \quad (9)$$

where β' is a PZT coefficient in appropriate units relating PZT voltage difference ΔV3 and perimeter length change and p0 is the perimeter length at a reference temperature T0. The estimated length changes, $\Delta z_T$ and $\Delta z_{PZT}$(peri), are similarly compared for local temperature consistency for the configuration in FIG. 3.

Use of a wire-wound hollow tube as part of the system allows separate and independent measurements to be made of estimated surface recession, local temperature and local increase in tube length as a result of temperature increase. Several consistency checks can be performed on these numerical values to determine overall consistency and to identify possible anomalies.

Figure 4A:
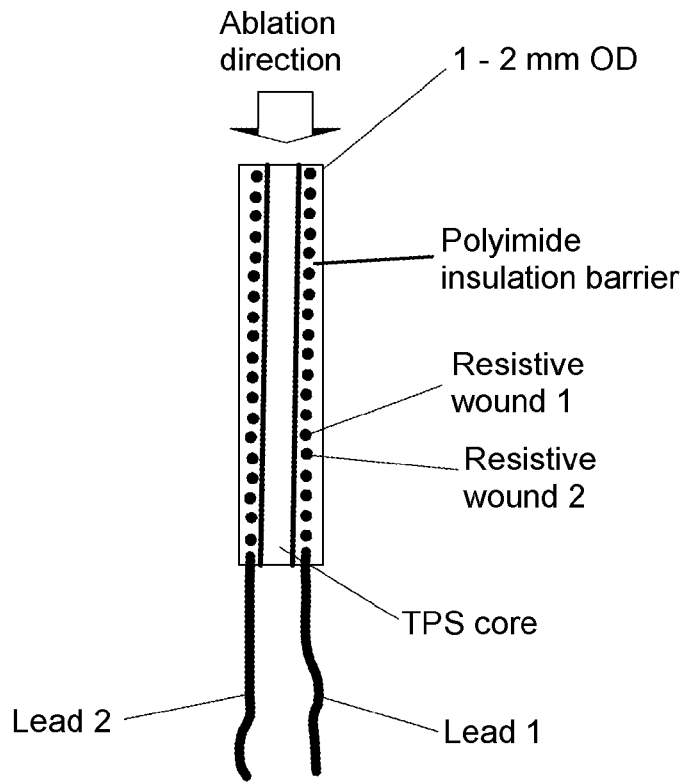
FIGS. 4A/4B are a cross-sectional view of an embodiment of the invention.
Figure 4B:
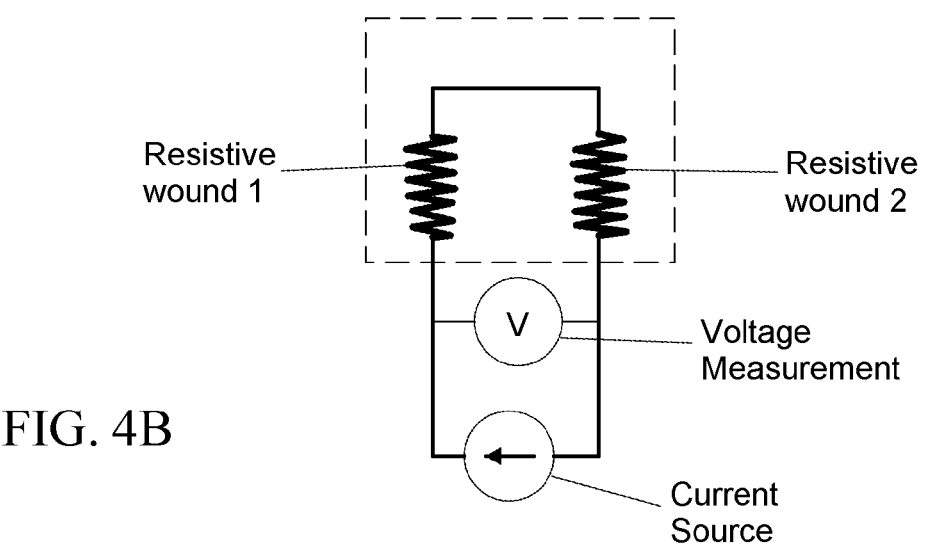

FIG. 4A is a cross-sectional view of the surface recession measurement system, a Hollow aErothermal Ablation and Temperature sensor (referred to as "HEAT" for convenience) and illustrates an equivalent electrical circuit (FIG. 4B). One embodiment of the HEAT sensor consists of two Pt—W, Pd—W, Pt, Pd, W or Ni resistive wires—procured individually "enameled" with polyimide, wound around a polyimide tube and secured with a coating of liquid polyimide. The fabrication process preferably includes placing the sensor inside a forced convection oven to cure the liquid polyimide. Where more than one layer of coating is applied, the sensor should be cured multiple times. Contingent upon its availability, the same material as the surrounding TPS is used to fabricate a core piece; the core is then inserted and bonded inside the polyimide tube. At least eight different configurations are available in the design of the sensing portion of a HEAT sensor. The different configurations are achieved by varying the size of the polyimide tube, by determining whether or not to provide a coating on the wound resistive wire, and by selecting the material for securing the resistive wires to the polyimide tube. An optimal HEAT design includes two wires, wound around a larger diameter polyimide tube (0.069-in) and secured with a cured liquid polyimide coating. The pitch of the wire winding (turns per unit length) is chosen to provide approximately 2000 Ohms per inch of available HEAT sensing length.

Several steps are still required following fabrication of a HEAT sensor. The HEAT sensor is cut to a specified length and a resistance weld operation must be performed at one end to create a junction between the two wires for initial condition measurements prior to formation of any char. In addition, the core piece is bonded to the inside wall of the polyimide hollow tube, and lead wires must be attached to the non-welded end of the sensor. The final design of a completed HEAT sensor may differ from one application to another. The design depends upon design iterations, sensor length requirements, choice of TPS material(s), availability of raw materials and/or instrumentation process limitations. A completed HEAT sensor has a length of about 1-2.5 cm and a width of 1-2 mm. A HEAT detector, intended for a 2.5-cm thick TPS material, is 2.4 cm long and has a 1.5 mm outer diameter (OD). In one embodiment, each HEAT sensor has two resistive legs, with a junction located at the tip of the sensor. The welded tip and subsequent formation of charred polyimide upon exposure to a heat flux input provides an electrical bridge between the two wires. The resistance of the char, although observed to be small compared to other errors, forms part of the total output resistance of the HEAT sensor. Keeping the lead wire resistance smaller than the HEAT sensor resistance assures that the sensor operates in the two legged configuration shown in FIG. 1.

The HEAT sensor alone is a passive resistive device that requires an external electrical signal to operate. When a constant current excitation is used, a voltage drop across the source can be measured and recorded on a data system. The voltage difference reading is proportional to the total series resistance associated with the source. Assuming that the contributions to resistance associated with the lead wires and temperature effects are negligible, that the constant current source is stable, and that the wire winding is uniform, the conversion from HEAT resistance to HEAT length increases linearly with change $\Delta T$ in temperature. The stability of the constant current is important measuring total series resistance.

The Interaction Heating Facility (IHF) is one of several arc heaters operated by the Thermophysics Facilities Branch at NASA Ames Research Center. The IHF is a 60 MW segmented arc heater that can provide cold wall heat fluxes ranging from 100 to 1400 Watts/cm$^2$ at the stagnation point of 10-cm diameter hemispherical model. Stagnation pressures are typically in a range of 1-120 kPa. Air is typically used as the test gas. Many references may be found in the literature containing additional details on the IHF.

A Photogrammetric Recession Measurement (PRM) system has been successfully developed and used during arc jet testing in the 60 MW segmented arc heater at NASA Ames. The technique utilizes stereo images captured by two synchronized high-speed video cameras to determine the surface recession of an arc jet model as a function of time. The PRM system was used to record the surface recession during various IHF Arc Jet tests conducted on specimens instrumented with HEAT sensors.

An Arc Jet specimen with a flat-faced cylindrical geometry was instrumented with one HEAT sensor and tested in the IHF. The model was made from Phenolic Impregnated Carbon Ablator (PICA) TPS material and had a 7.5 cm outer diameter and a thickness of about 4.5 cm. The arc heater operating conditions were fixed to provide an estimated stagnation point cold wall heat flux of 200 W/cm$^2$ using air as the main test gas. The recorded data from the HEAT sensor is plotted or displayed, along with post-mortem and final PRM measurements for comparison; the time scale begins when the model is first inserted into the arc jet test gas stream.

What is claimed is:

1. A system for estimating in-depth thermal response that is correlated to shape of a surface that is undergoing ablation, the system comprising:
    a layer of electrically insulating material provided in a cylindrically shaped tube having a hollow inner core and having a longitudinal axis;
    first and second helices of electrically resistive wire material, surrounding the tube along the longitudinal axis, inter-wound with each other in a parallel sense, each helix having a first end, having approximately the same length L(t), having first and second electrical resistivities, $\rho 1$ and $\rho 2$, separated from each other by a small distance, and having an insulation layer extending between the first and second helices;
    an electrical current source connected adjacent to one of the first ends of the first and second helices;
    a voltmeter connected between the first ends of the first and second helices, to provide a measurement of at least one voltage difference V1(t), as a function of time between the first and second helices, for at least one time, t=t1, as the length L(t) changes in response to recession of the tube; and
    a numerical processor that receives the at least one voltage difference value, V1(t1), and provides an estimate of the length value L(t) of at least one of the first and second helices at the time t1, based upon the voltage difference V1(t1);
    where a portion of the insulation layer material undergoes charring at high temperature and becomes electrically conducting in a charred state at a second end of each of the first and second helices.

2. The system of claim 1, wherein said insulation layer material comprises at least one of polyimide and kapton.

3. The system of claim 1, wherein at least one of said first helix of resistive material and said second helix of resistive material is comprised of at least one of Pt—W, Pd—W, Pt, Pd, W and Ni.

4. The system of claim 1, wherein said first helix of resistive material and said second helix of resistive material have the same values of electrical resistivity.

5. The system of claim 1, wherein said first helix of resistive material and said second helix of resistive material have different values of electrical resistivity.

6. The system of claim 1, wherein said inner core contains a piezoelectric material connected to said tube, that produces a voltage difference in response to impressing a temperature difference or thermal stress on said tube.

7. The system of claim 1, wherein said numerical processor is programmed to estimate said approximate length value L(t) as $$L(t) = \{V1(t)/I - 2R(\text{lead})\}/(\rho 1 \cdot g + \rho 2 \cdot g),$$

where R(lead) is a contact resistance value, g is a geometric parameter that relates said length L(t) to a corresponding length of each of said first and second helices and I is a constant current value provided by said current source.

8. The system of claim 1, further comprising:
a section of selected piezoelectric material, oriented in a direction parallel to said longitudinal axis and attached to a cylindrical sector of said cylindrically shaped tube;
a voltmeter, connected to the piezoelectric section at spaced apart first and second locations along a line segment oriented parallel to said longitudinal axis, to provide a measurement of a second voltage difference $V2(t_s)$ between the first and second locations for at least one sampling time, $t = t_s$; and
a processor that receives the second voltage difference $V2(t_s)$ and provides an estimate, and a display of the estimate, of a distance $d_{12}(t_s)$ between the first and second locations at the sampling time, $t = t_s$.

9. The system of claim 1, further comprising:
first and second thermocouple mechanisms, connected to and positioned at first and second spaced apart locations along said cylindrically shaped tube, to provide first and second temperature measurements, $T = T1(t_s)$ and $T = T2(t_s)$, at the respective first and second locations at or near a selected sampling time, $t = t_s$;
a processor that receives the first and second temperature measurements and estimates and displays a temperature value, $T = T3(t_s)$ at a third location, determined with reference to the first and second locations, on said tube.

10. The system of claim 1, further comprising:
a section of selected piezoelectric material, attached to said tube and oriented along a portion of a circumference of said cylindrically shaped tube in a direction transverse to said longitudinal axis of said tube;
a voltmeter, connected to the piezoelectric material at spaced apart first and second circumference locations along the tube circumference, to provide a measurement of a third voltage difference $V3(t_s)$ between the first and second locations for said sampling time, $t = t_s$; and
a processor that receives the third voltage difference value $V3(t_s)$ and provides an estimate, and a display of the estimate, of a distance $d'_{12}(t_s)$, measured circumferentially, between the first and second locations at the sampling time, $t = t_s$.

11. The system of claim 1, wherein said voltmeter provides a measurement of said voltage difference V1(t) for said first time t1 and for at least a second time t2 that is spaced apart from said first time t1, to provide an estimate of said length L(t=t1) at said first time t1 and to provide an estimate of said length L(t=t2) at the second time t2.

12. The system of claim 1, wherein said small distance between said first and second helices is no more than about 0.005 inches.

13. The system of claim 1, wherein said char has an associated electrical resistivity that is no more than about 2 percent of said electrical resistivity of at least one of said first and second helices.

\* \* \* \* \*